March 19, 1929.   F. W. ELY   1,706,219
SLUICE GATE
Filed July 11, 1927   2 Sheets-Sheet 1
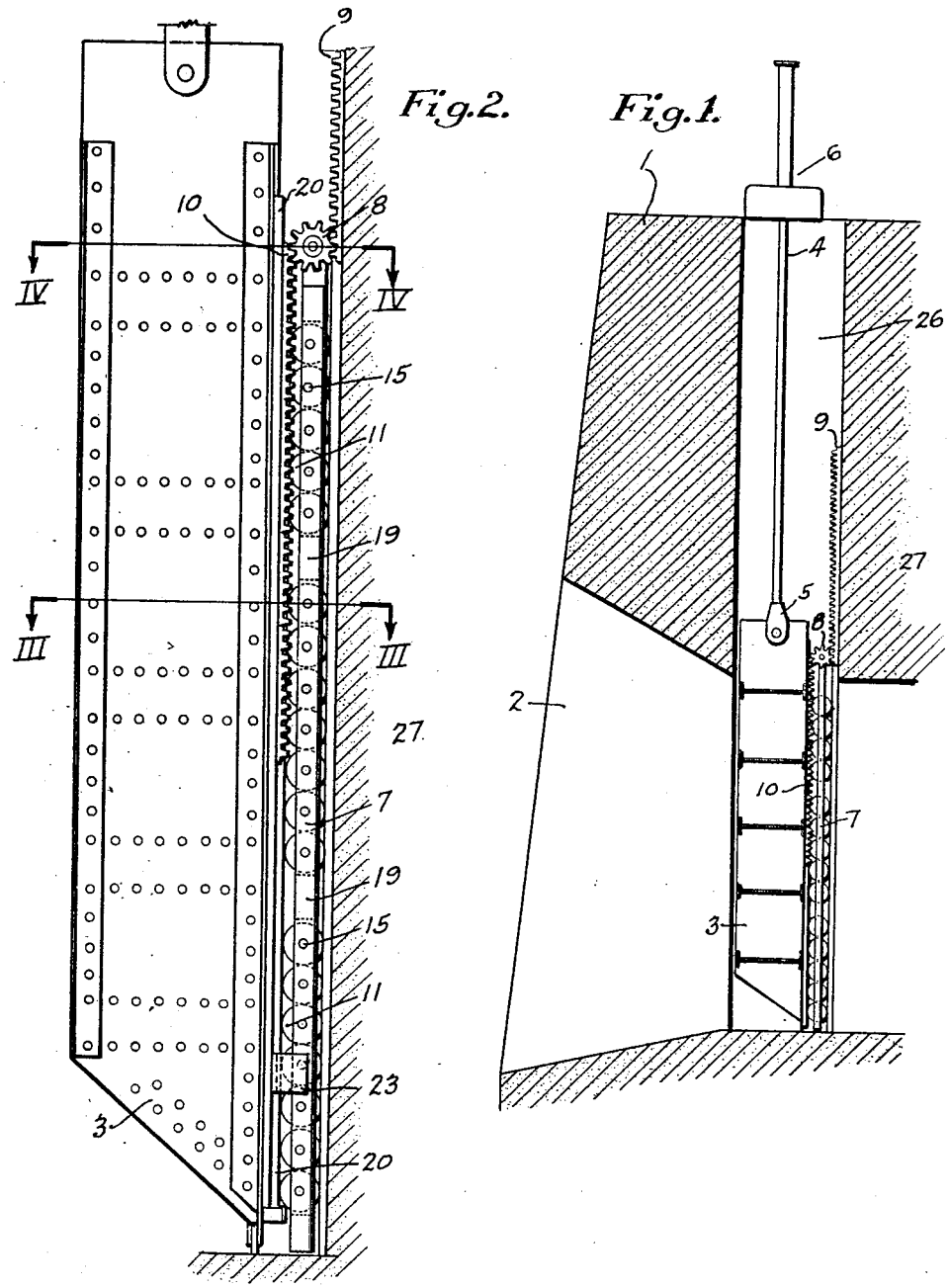
INVENTOR
Frederick W. Ely
by Brown & Critchlow,
his attorneys.

March 19, 1929.　　　　F. W. ELY　　　　1,706,219
SLUICE GATE
Filed July 11, 1927　　2 Sheets-Sheet 2
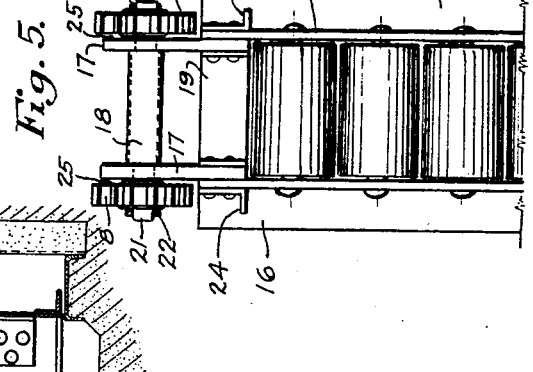
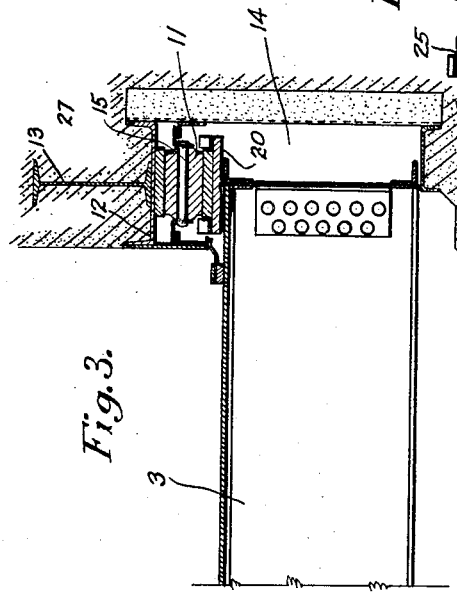
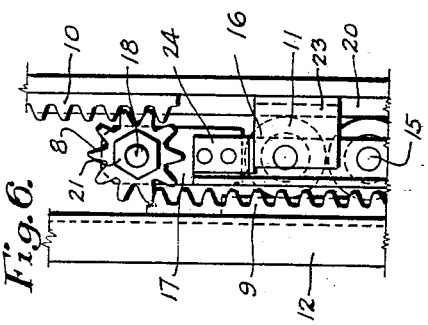
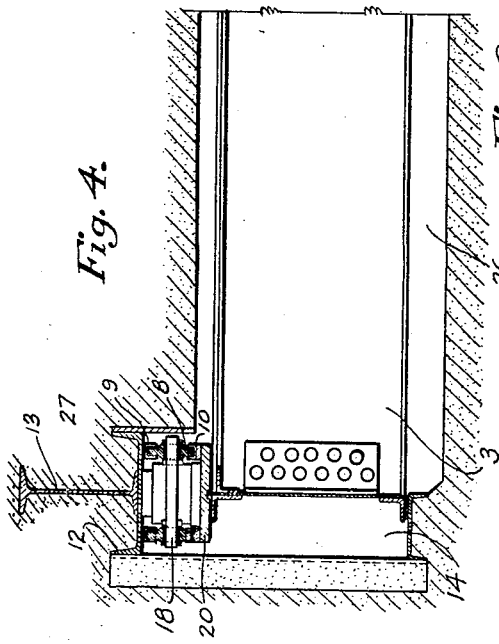
INVENTOR
Frederick W. Ely
by Brown & Critchlow
his attorneys.

Patented Mar. 19, 1929.

1,706,219

UNITED STATES PATENT OFFICE.

FREDERICK W. ELY, OF DORMONT, PENNSYLVANIA.

SLUICE GATE.

Application filed July 11, 1927. Serial No. 204,693.

This invention relates to vertically movable gates for controlling passages through openings in fixed structures, such as dams, or weirs, and has especially to do with the roller bearings frequently used for reducing frictional resistance between the gate and the structure when the gate is raised or lowered.

Heretofore such roller trains have been suspended by a cable or cables passing underneath a sheave attached to the top of the train. One end of the cable is usually fastened to a fixed portion of the dam, and the other end to the gate itself, in such a manner that the train is raised and lowered with the gate. This construction is unsatisfactory, partly for the reason that the cables occasionally break, permitting the roller train to fall, and considerable difficulty is encountered in recovering and properly repositioning and connecting it.

The object of this invention is to so construct a movable gate roller train, and so connect it to and correlate it with the vertical movements of the gate, that in a simple and effective manner the objectionable features of a cable-suspended roller train are eliminated.

In the drawings which illustrate one embodiment of my invention as applied to a dam and passage-controlling gate therethrough, Fig. 1 represents, somewhat diagrammatically, a section through a dam and sluice gate in its passage-closing condition equipped with the roller bearing construction; Fig. 2 an enlarged view of a portion of Fig. 1; Fig. 3 a section on the line III—III, Fig. 2; Fig. 4 a sectional view on the line IV—IV, Fig. 2; Fig. 5 a front view of the upper end of the roller train; and Fig. 6 a side view of the upper end of the roller train and racks when the gate is in its raised position.

In these drawings a dam 1 is shown with a passageway 2 and a vertically movable gate 3, shown in its passage-closing position. Throughout the specification and in the claims, this passageway will be designated as a "sluice" or "sluiceway", it being understood that such terms are used to designate passageways such as herein shown as well as those through weirs and similar structures. Rising from sluiceway 2 is a vertical walled shaft 26 for receiving the gate, and, opening from the ends of the sluiceway, are vertical walled slots 14, which also form a part of the shaft 26. As will be apparent from the drawings, the ends of the gate 3 extend into slots 14, each of which has three walls. However, the gates may bear upon the face of a dam, as shown, for example in Figs. 5–7 of Patent No. 1,306,370. These gates are so widely used and vary so greatly in structural details that no detailed description of the construction shown herein will be given. Gate 3 is raised and lowered by means of a cable or rod 4, which may be attached to the gate in any manner, as by a clevis 5, and operated by a suitable gate-moving mechanism 6.

Mounted between the gate 3 and the vertical walls 27 of pockets 14 are roller trains 7, each of which comprises a suitable number of rollers 11, rotatably mounted on shafts or pins 15 passing therethrough and supported on angles 16. In order to strengthen this structure, channel sections 19 may be attached to angles 16 at suitable intervals.

According to this invention, the roller trains are provided with pinions arranged for such coaction with fixed racks that the roller trains are positively moved in the same direction as the gate, and are prevented from dropping or otherwise slipping out of position.

One means of securing this result is, as herein illustrated, to mount in each of the roller trains 7, two pinions 8, which may turn on or with a shaft 18, carried by arms 17 riveted or otherwise fastened to the top of the roller train. Spacers 25 may be arranged between arms 17, and the pinions, and the latter may be secured to shafts 18 by nuts 21 locked by keys or cotter pins 22. At each end of the down-stream side of the gate are fastened plates 20, and opposite these plates are fixed guides which may be composed of channels 12, attached to I-beams 13 in the vertical walls 27 of pockets 14. Fastened to plates 20 are fixed racks 10, and opposite them, on guides 12 are fixed racks 9, these latter being so disposed that the pinions engage on one side with racks 9 and on the opposite side with racks 10.

The action of this arrangement is to draw the roller train up as the gate is raised, or to lower it with the gate, always maintaining it in its proper position. This arrangement effectively overcomes the disadvantages of the connections commonly used to move the roller trains, and may be constructed as readily and at substantially the same cost as the mechanism previously used. Among other advantages may be mentioned the elimination of upkeep expense incident to the breakage, repair and replacement of the cables previously used.

It is occasionally necessary or desirable to entirely remove the gate from a dam or like structure, and hitherto it has been difficult to position suspended cable-supported rollers properly when the gate was returned to its operative position. According to this invention, this is accomplished by affixing laterally extending brackets 23 to the bottom of the gate, which brackets engage lugs 24 projecting laterally from the upper end of the roller train. When the gate reaches its wide open position, the pinions are positioned as shown in Fig. 6; that is, pinion teeth rest on the upper tooth of rack 9, but the pinions are still engaged with the lower teeth of rack 10. Brackets 23 then engage lugs 24, and further upward movement of the gate results in equal and simultaneous elevation of gate and roller train. Consequently when they are again lowered, the roller train is in proper relation to engage wall racks 9, after which the entire assembly functions as previously described.

According to the provisions of the patent statutes, I have explained the principle and operation of my invention and have illustrated and described what I now consider to represent its best embodiment. However, I desire to have it understood that, within the scope of the appended claims, the invention may be practiced by others forms of construction than that particularly illustrated and described.

I claim:

1. The combination with a sluiceway having gate-bearing walls at its sides, a vertically movable gate for controlling flow through the sluiceway, and vertically disposed roller bearing trains arranged between each end of said gate and said walls; of oppositely disposed racks attached to the ends of said gate and said walls, and pinions rotatably attached to said roller trains and meshing on opposite sides with said racks, whereby said roller trains are positively positioned with respect to said gate and move synchronously with it in response to vertical movements thereof.

2. The combination with a sluiceway having gate-bearing walls at its sides, a vertically movable gate for controlling flow through the sluiceway, and roller bearing trains comprising upright parallel bars and a plurality of cylindrical rollers journalled therebetween arranged between each end of said gate and said walls; of oppositely disposed racks attached to the ends of said gate and said walls, and pinions rotatably attached to said roller trains and meshing on opposite sides with said racks, whereby said roller trains are positively positioned with respect to said gate and move synchronously with it in response to vertical movements thereof.

3. The combination with a sluiceway having gate-bearing walls at its sides, a vertically movable gate for controlling flow through the sluiceway, and roller bearing trains comprising upright parallel bars and a plurality of cylindrical rollers journalled therebetween arranged between each end of said gate and said walls; of oppositely disposed racks attached to the ends of said gate and said walls, and rotating pinions journalled at the upper ends of said roller trains and meshing on opposite sides of said racks, whereby said roller trains are positively positioned with respect to said gate and move synchronously with it in response to vertical movements thereof.

4. The combination with a sluiceway having gate-bearing walls at its sides, a vertically movable gate for controlling flow through the sluiceway, and roller bearing trains arranged between each end of said gate and said walls; of oppositely disposed racks attached to the ends of said gate and said walls, pinions rotatably attached to said roller trains and meshing on opposite sides with said racks, and lugs secured to said roller trains adapted to be engaged by said gate, whereby said roller trains are positively positioned with respect to said gate and move synchronously with it in response to vertical movements thereof, and whereby proper relation is maintained between said gate and said roller train when removed from and returned to operative position.

5. The combination with a sluiceway having a vertical walled shaft, vertical shaft slots opening therefrom, a vertically movable gate having its ends extending into said slots, and roller bearing trains arranged between each end of said gate and the adjacent wall of said slots; of oppositely disposed racks attached to the ends of said gate and said slot walls, and pinions rotatably attached to said roller trains and meshing on opposite sides with said racks, lugs secured to the top of said roller trains, and brackets fastened to the bottom of said gate for engaging said lugs, whereby said roller trains are positively positioned with respect to said gate and move synchronously with it in response to vertical movements thereof to positively maintain the proper relation between said gate and said roller train when removed from and returned to said shaft.

6. The combination with a fixed water-retaining structure having an opening therethrough, a vertically disposed movable gate controlling flow through the opening, and roller bearing trains acting between the ends of said gate and said structure; of oppositely disposed racks fixed to said gate and said structure, and rotatable pinions journalled in said roller trains and meshing on opposite sides with said racks, whereby said roller trains are positively positioned with respect to said gate and move synchronously with it in response to vertical movements theerof.

In testimony whereof, I sign my name.

FREDERICK W. ELY.